United States Patent
Shiohara

(10) Patent No.: US 7,123,302 B2
(45) Date of Patent: Oct. 17, 2006

(54) SEMICONDUCTOR DEVICE

(75) Inventor: Ryuichi Shiohara, Matsumoto (JP)

(73) Assignee: Seiko Epson Corporation, (JP)

( * ) Notice: Subject to any disclaimer, the term of this patent is extended or adjusted under 35 U.S.C. 154(b) by 714 days.

(21) Appl. No.: 10/241,807

(22) Filed: Sep. 11, 2002

(65) Prior Publication Data

US 2003/0076430 A1    Apr. 24, 2003

(30) Foreign Application Priority Data

Sep. 11, 2001    (JP)    ............................ 2001-274843

(51) Int. Cl.
  *H04N 3/14* (2006.01)
(52) U.S. Cl. ................. 348/308; 348/222.1; 250/208.1
(58) Field of Classification Search ................... None
  See application file for complete search history.

(56) References Cited

U.S. PATENT DOCUMENTS

| 5,801,657 | A * | 9/1998 | Fowler et al. ............... 341/155 |
| 6,525,304 | B1 * | 2/2003 | Merrill et al. ............ 250/208.1 |
| 2005/0036041 | A1 * | 2/2005 | Gallagher et al. ........ 348/222.1 |

FOREIGN PATENT DOCUMENTS

| JP | 54-93349 | 7/1979 |
| JP | 05-110440 | 4/1993 |
| JP | 09-238286 | 9/1997 |

OTHER PUBLICATIONS

G.L. Engel "Switched-capacitor Logarithmic DAC", Electronics Letters, vol. 35 No. 2, Jan. 21, 1999, pp. 111-112.*
Communication from Japanese Patent Office re: related application.

* cited by examiner

*Primary Examiner*—Ngoc-Yen Vu
*Assistant Examiner*—Dillon Durnford-Geszvain
(74) *Attorney, Agent, or Firm*—Harness, Dickey & Pierce, P.L.C.

(57) ABSTRACT

A semiconductor device equipped with an area sensor 2 including a plurality of image sensors S11–Smn outputting analog image signals corresponding to the amount of received light; an A/D conversion section 4 including a signal latch section 3 latching the analog image signals, a counter 6 that successively increments integer values and outputs the same, a sweep signal generation section 7 outputting sweep signals whose potential rises in a polygonal line with respect to the integer values, comparators C1–Cn comparing the analog image signals and the sweep signals, and outputting high level signals when the sweep signals are greater than the analog image signals, and latches L1–Ln latching and outputting integer values when signals output from the comparators C1–Cn become a high level; and a signal latch section 5 latching digital image data output from the A/D conversion section 4 and outputting the same.

9 Claims, 9 Drawing Sheets

SEMICONDUCTOR DEVICE

BACKGROUND OF THE INVENTION

1. Technical Field of the Invention

The present invention relates to a semiconductor device that photographs images and outputs digital image data.

2. Prior Art

In recent years, digital still cameras and digital video cameras with over one million pixels have come into use. These digital still cameras and the like are quipped with an area sensor and an A/D converter, and obtain digital image data by digitally converting output signals (analog image signals) of the area sensor by the A/D converter. Digital still cameras and the like used in recent years need an A/D conversion speed of about 20 MHz–30 MHz, and therefore often use pipeline type A/D converters that are capable of performing high-speed A/D conversion. FIG. 6 shows an example of a conventional circuit (digital image photographing circuit) for photographing digital images. Referring to FIG. 6, the digital image photographing circuit 40 is equipped with an area sensor 41 having sensors disposed in matrix, a signal latch section 42 that latches analog image signals output from the sensors within the area sensor 41, a CDS circuit 43 that removes noise components from the analog image signals output from the signal latch section 42, and a pipeline type A/D converter 44 that converts the analog image signals output from the CDS circuit 43 into digital image data.

The digital image photographing circuit 40 shown in FIG. 6 generally uses an image sensor having a CCD (charge coupled device) transmission circuit that can photograph high-quality images with low noise. For A/D conversion, a pipeline type A/D converter is used to photograph moving pictures and take out digital image data at a high speed.

In recent years, digital still cameras and digital video cameras with over one million pixels have come into use. These digital still cameras and the like are equipped with an area sensor and an A/D converter, and obtain digital image data by digitally converting output signals (analog image signals) of the area sensor by the A/D converter. Digital still cameras and the like used in recent years need an A/D conversion speed of about 20 MHz–30 MHz, and therefore often use pipeline type A/D converters that are capable of performing high-speed A/D conversion. FIG. 6 shows an example of a conventional circuit (digital image photographing circuit) for photographing digital images. Referring to FIG. 6, the digital image photographing circuit 40 is equipped with an area sensor 41 having sensors disposed in matrix, a signal latch section 42 that latches analog image signals output from the sensors within the area sensor 41, a CDS circuit 43 that removes noise components from the analog image signals output from the signal latch section 42, and a pipeline type A/D converter 44 that converts the analog image signals output from the CDS circuit 43 into digital image data.

Also, a semiconductor device manufacturing process for CCDs and a semiconductor device manufacturing process for pipeline type A/D converters are completely different from each other, and therefore there is a problem in that the CCDs and pipeline type A/D converter cannot be formed on a single semiconductor chip.

Also, in recent years, CMOS type image sensors that produce higher image quality have been made available. The CMOS type image sensor can be formed with a logic circuit such as an A/D converter on a single semiconductor chip. (Here, the CMOS type image sensor means sensors in general terms that can be formed on a single semiconductor chip using a CMOS manufacturing process which forms A/D converters and digital processing circuits.)

The CMOS type image sensor can be formed on the same semiconductor chip where a pipeline type A/D converter having a large circuit and a large power consumption is formed, but also can be formed on the same semiconductor chip where a column type A/D converter that can achieve a lower power consumption is formed. FIG. 7 shows an example of a semiconductor device using a column type A/D converter. In FIG. 7, a semiconductor device 50 is equipped with an area sensor 51 with CMOS type image sensors disposed in matrix, and a column type A/D converter 52.

FIG. 8 shows an internal structure of the column type A/D converter 52. In FIG. 8, the column type A/D converter 52 includes a counter 53, a sweep signal generation section 54, comparators C11–C1n, and latches L11–L1n.

The counter 53 successively outputs unsigned integer values (0–1023) having a 10-bit width. The counter 53 successively outputs the integer values with a 10-bit width for the following reasons. As described later, the integer values output from the counter 53 are latched by the latches L11–L1n, and output as digital image data. Accordingly, the bit width of the digital image data is the same as the bit width of the integer values output from the counter 53. However, the digital image data with 8-bit width is not sufficient in actual use as high-quality image data, and about 10-bit width is normally required.

The sweep signal generation section 54 outputs sweep signals according to the integer values output from the counter 53. FIG. 9 shows a relationship between the integer values that are output from the counter 53 and potentials of the sweep signals that are output from the sweep signal generation section 54 (i.e., sweep signal output characteristic). In FIG. 9, integer values output from the counter 53 are indicated along a horizontal axis direction, and potentials of the sweep signals that are output from the sweep signal generation section 54 are indicated along a vertical axis direction. As shown in FIG. 9, the sweep signal generation section 54 output potentials that linearly increase with respect to the integer values output from the counter 53. It is noted that, in general, the power supply voltage of a CMOS type image sensor is 3.3V, and an amplitude of an analog image signal that is output from the CMOS type image sensor is about 2 V. Therefore, the sweep signal generation section 54 outputs a 2V sweep signal with an amplitude of (VB)V through (VB+2)V according to the amplitude of the analog image signal that is output from the CMOS type image sensor.

When a column type A/D converter is used, an area sensor and the column type A/D converter can be integrated on a single semiconductor device. However, the column type A/D converter has a problem in that it is difficult to secure the dynamic range. Also, the column type A/D converter has a problem in that the A/D conversion takes a long time because the cycle of the sweep signal in a ramp shape must be made longer in order to achieve a highly accurate A/D conversion.

In view of the above, it is an object of the present invention to provide semiconductor devices in which an area sensor and an A/D converter can be formed on a single semiconductor chip, which is capable of reducing power consumption, converting analog image signals to digital image data with a simple circuit, reducing noise sources, reducing costs, and compressing the bit width of the digital image data while achieving a high dynamic range.

SUMMARY OF THE INVENTION

To solve the problems described above, a semiconductor device in accordance with the present invention photographs images and outputs digital image data, the semiconductor device comprising: an area sensor including a plurality of image sensors each of which outputs an analog image signal corresponding to the amount of received light; and an A/D conversion section that includes a first circuit that outputs a numerical value ranging from a first value to a second value, a second circuit that outputs a signal whose potential non-linearly rises as the numerical value changes from the first value toward the second value, a third circuit that compares the analog image signal and the signal output from the second circuit and outputs a comparative signal, and a fourth circuit that outputs the numerical value as digital image data according to the comparative signal.

Here, the second circuit may output a signal whose potential rises in a polygonal line as the numerical value shifts from the first value toward the second value. Also, the A/D conversion section may output digital image data having a narrower bit width than a bit width of digital image data provided as an analog image signal output from the image sensors is linearly A/D converted. The A/D conversion section may output digital image data having an 8-bit width. Also, the image sensors may be CMOS sensors. Furthermore, the image sensors may be disposed in matrix.

With the semiconductor device in accordance with the present invention, the area sensor and an A/D converter can be formed on the same semiconductor chip, the power consumption can be reduced, analog image signals to digital image data can be converted with a simple circuit, noise sources can be reduced, the cost can be reduce, and the bit width of the digital image data can be compressed while achieving a high dynamic range.

DETAILED DESCRIPTION OF THE PREFERRED EMBODIMENTS OF THE PRESENT INVENTION

An embodiment of the present invention is described below with reference to the accompanying drawings. It is noted that the same components are indicated with the same reference numbers, and their description is not repeated.

Figure 1:
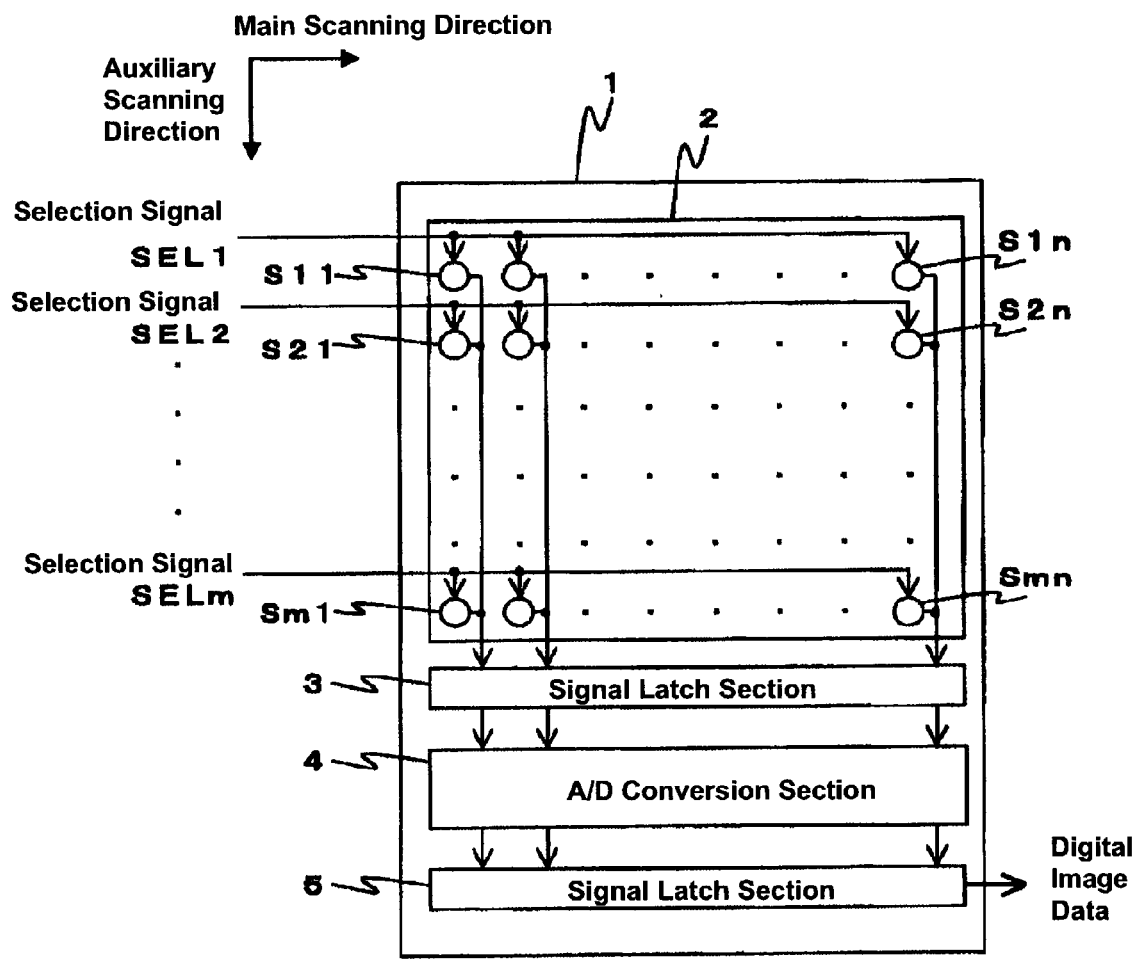
FIG. 1 shows an outline of a semiconductor device in accordance with an embodiment of the present invention.

FIG. 1 shows an outline of a semiconductor device in accordance with an embodiment of the present invention. FIG. 1 shows a semiconductor device 1, which is equipped with an area sensor 2 that outputs analog image signals, a signal latch section 3 that latches the analog image signals output from the area sensor 2, an A/D conversion section 4 that converts the analog image signals output from the signal latch section 3 to digital image data, and a signal latch section 5 that latches and outputs the digital image data output from the A/D conversion section 4.

The area sensor 2 includes m×n image sensors S11–Smn disposed in a matrix of m rows in the auxiliary scanning direction (common direction) and n columns in the main scanning direction (segment direction). Selection signals SEL1–SELm are successively input in the respective image sensors S11–Smn within the area sensor 2, and those of the image sensors S11–Smn that are input with the selection signals output analog image signals corresponding to the amount of received light to the signal latch section 3. More specifically, the image sensors S11–Smn output (Vb)V upon receiving a minimum light amount within their light receivable range, output (Vt)V upon receiving a maximum light amount within the light receivable range, and output linear potentials in a range between (Vb)V and (Vt)V upon receiving a light amount in between according to the amount of light received. It is noted that a potential difference between the (Vb)V and (Vt)V is about 0.6V to 0.8V.

The signal latch section 3 amplifies analog image signals received from the area sensor 2 with a predetermined amplification ratio, and outputs analog image signals having amplitudes of (VB)V through (VT)V to the A/D conversion section 4. It is noted that a potential difference between the (VB)V and the (VT)V is about 2V.

Figure 2:
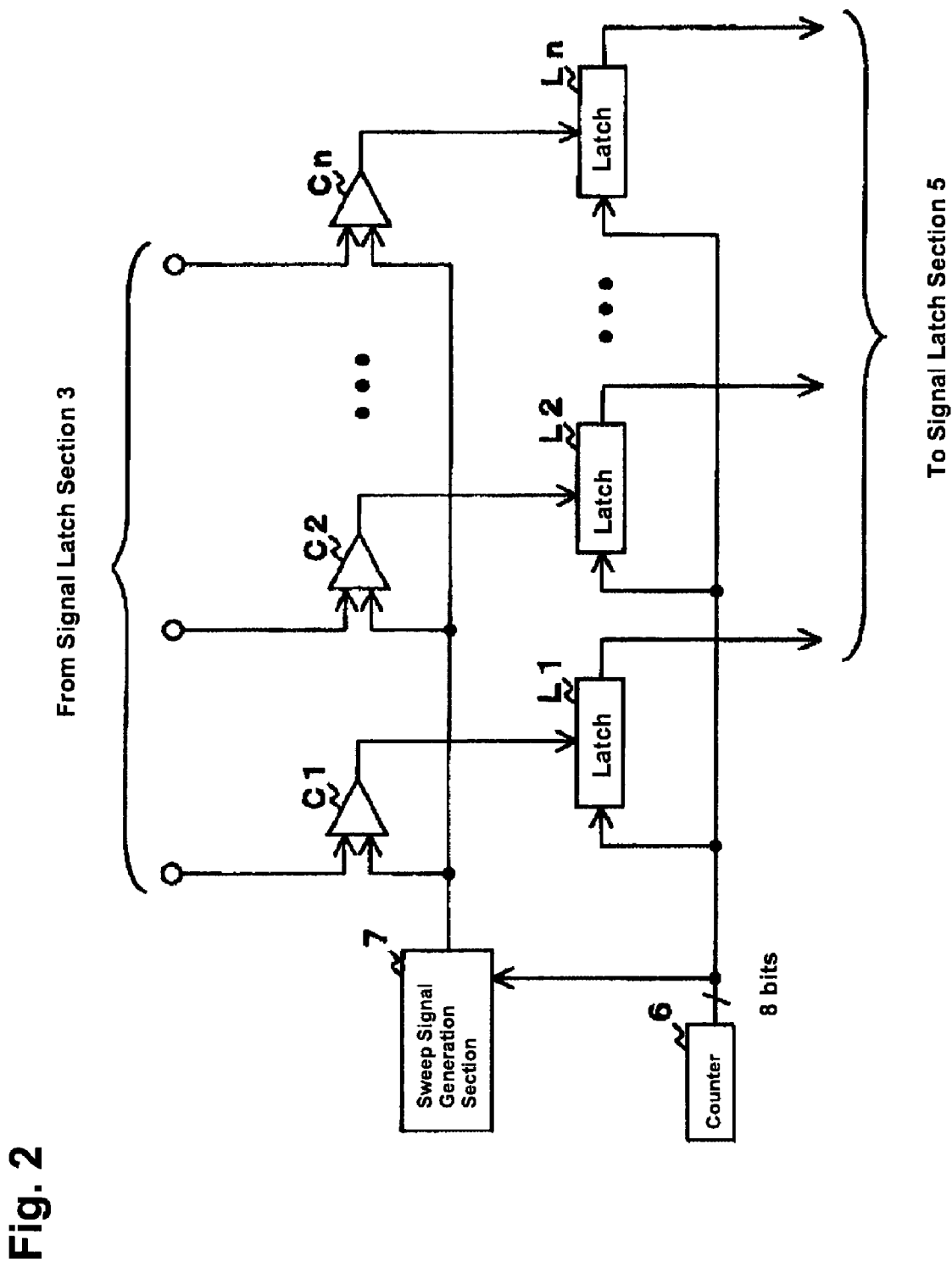
FIG. 2 shows an example of an internal structure of an A/D conversion section shown in FIG. 1.

FIG. 2 shows an example of an internal structure of the A/D conversion section 4. In FIG. 2, the A/D conversion section 4 includes a counter 6, a sweep signal generation section 7, comparators C1–Cn and latches L1–Ln.

The counter 6 successively outputs unsigned integer values (0–255) having an 8-bit width.

Figure 3:
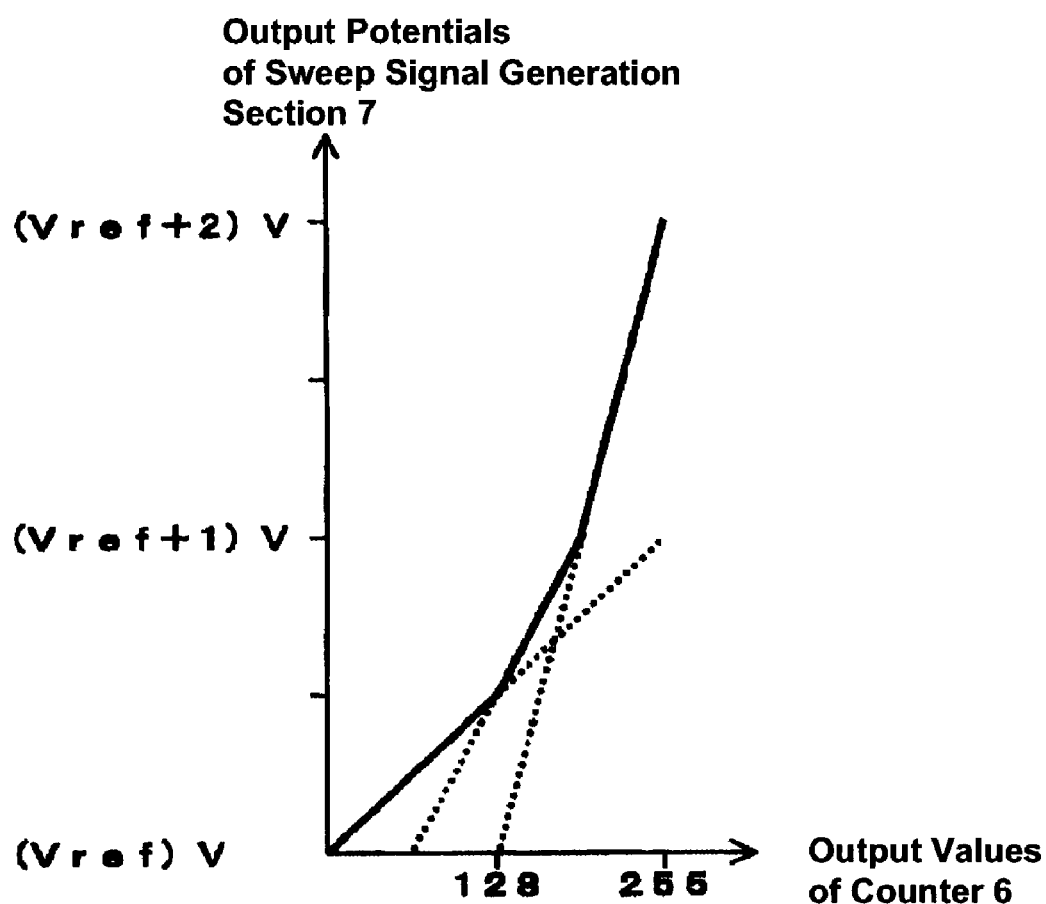
FIG. 3 is a graph showing the sweep signal output characteristic of a sweep signal generation section shown in FIG. 2.

The sweep signal generation section 7 outputs sweep signals having potentials ranging from a potential (Vref)V that is generally the same as (VB)V to a potential (Vref+2)V that is generally the same as (VB+2)V according to the integer values output from the counter 6. FIG. 3 is a graph showing the relationship between integer values output from the counter 6 and potentials of the sweep signals output from the sweep signal generation section 7 (i.e., sweep signal output characteristic). In FIG. 3, integer values output from the counter 6 are indicated along a horizontal axis direction, and potentials of the sweep signals that are output from the sweep signal generation section 7 are indicated along a vertical axis direction.

As indicated in FIG. 3, when an integer value output from the counter 6 is x, and $0 \leq x \leq 127$, the sweep signal generation section 7 calculates y by $$y = x \tag{1}$$

Further, using y, it outputs a potential calculated by $$\text{(Output potential)} = Vref + 2 \times y/512 \tag{2}$$

Also, when $128 \leq x \leq 191$, the sweep signal generation section 7 calculates y by $$y = 2x - 128 \tag{3}$$

And using y, it outputs a potential calculated by the formula (2).

Further, when $192 \leq x \leq 255$, the sweep signal generation section 7 calculates y by $$y = 4x - 512 \tag{4}$$

And using y, it outputs a potential calculated by the formula (2).

The sweep signal output characteristic of the sweep signal generation section 7 shown in FIG. 3 is based on the human visual sense characteristic that recognizes brightness in proportion to the logarithm of the amount of light. Also, it serves, to the logarithmic characteristic of the human eyes' sensitivity, the purpose of maintaining the gradient accuracy in dark area since the human eyes are sensitive to changes in brightness in a dark area, and leniently recording the gradient accuracy in the bright area as the human eyes are rather insensitive to changes in brightness in a bright area.

Referring back to FIG. 2, the comparators C1–Cn compare the analog image signals output from the signal latch section 3 and the sweep signals output from the sweep signal generation section 7, output low level signals when the analog image signals are greater than the sweep signals, and output high level signals when the analog image signals are less than the sweep signals.

The latches L1–Ln latch the integer values output from the counter 6 when the output signals of the comparators C1–Cn are at a high level. The outputs from the latches L1–Ln become digital image data.

In this manner, the semiconductor device 1 can convert analog image signals output from the image sensors S11–Smn within the area sensor 2 to 8-bit digital image data and output the same.

As described above, with the semiconductor device in accordance with the present embodiment, digital image data, which would otherwise have a 9-bit width by nature, can be formed into digital image data having an 8-bit width. Also, the sweep time, which would otherwise become a problem in a column type A/D converter, can be shortened. Furthermore, a characteristic in which a high luminance range is compressed to the human visual sense can be realized.

Also, by forming an area sensor and an A/D conversion section in a single semiconductor device, the cost can be reduced.

Also, by using a column type A/D converter instead of a pipeline type A/D converter as has been conventionally used, the circuit can be simplified, and an A/D conversion can be performed even at low speeds. In general, an output of image data for 30 frames per second is required to display a moving picture, and the conversion time per one pixel corresponds to a time obtained by dividing 1/30 seconds by the total number of pixels. However, although the column type A/D converter needs to output data after conversion at high speeds, the conversion can be executed relatively slowly. For example, it is acceptable if the conversion of pixels in each line can be done in a period of time that is obtained by dividing 1/30 seconds by the number of lines.

Also, by using a column type A/D converter, the power consumption can be reduced, the risk of noise mixing can be reduced, and the stability in A/D conversion accuracy can be achieved.

Also, for an ordinary image, the data width of digital image data needs to be about a 10-bit width in order to secure the dynamic range of the gradient of the image. Further, in recent years, about a 12-bit width may be required. For this reason, A/D converters with higher accuracy are required. However, it is extremely difficult to realize those that can operate at high speeds with low power consumption. A column type A/D converter can readily achieve these features.

Also, the semiconductor device in accordance with the present embodiment can solve the problems in a column type A/D converter, relating to the sweep potential generation time, securing the dynamic range and the data amount of output data, which result from the necessity of performing the sweep operation for a long time to secure accuracy. In other words, within a low luminance range that requires great accuracy, the sweep potential is changed to be highly accurate and at low speeds, and from an intermediate luminance range to a high luminance range that do not require much accuracy, the sweep potential can be changed at high speeds.

It is noted that, in the present embodiment, the sweep signal generation section 7 outputs a sweep signal whose potential rises in a polygonal line, but may output a sweep signal whose potential rises nonlinearly, such as, in an exponential line, a quadratic functional line, or the like.

Also, in the present embodiment, the image sensors S11–Smn in the area sensor 2 are disposed in matrix, but may be disposed in a honeycomb configuration.

Also, in the present embodiment, the image sensors S11–Smn may be CMOS image sensors. In this case, the semiconductor device 1 can be manufactured by a CMOS manufacturing process.

Also, in the present embodiment, the counter 6 outputs unsigned integer values (0–255) having an 8-bit width. However, like the conventional semiconductor device 50, unsigned integer values (0–1023) having a 10-bit width can be output. In this case, digital image data, which would otherwise have a 11-bit width by nature, can have a 10-bit width.

Figure 4:
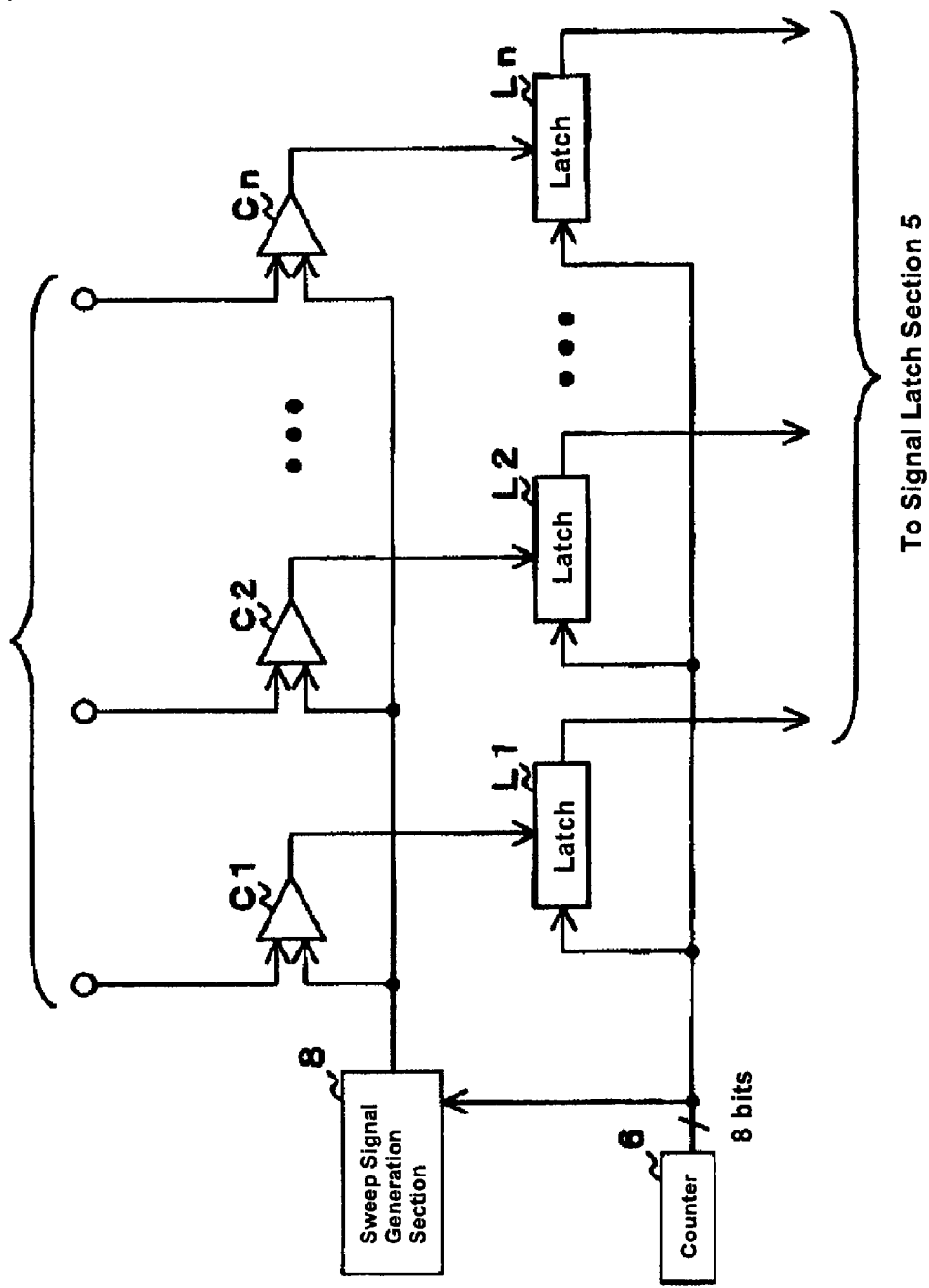
FIG. 4 shows an example of another internal structure of the A/D conversion section shown in FIG. 1.
Figure 5:
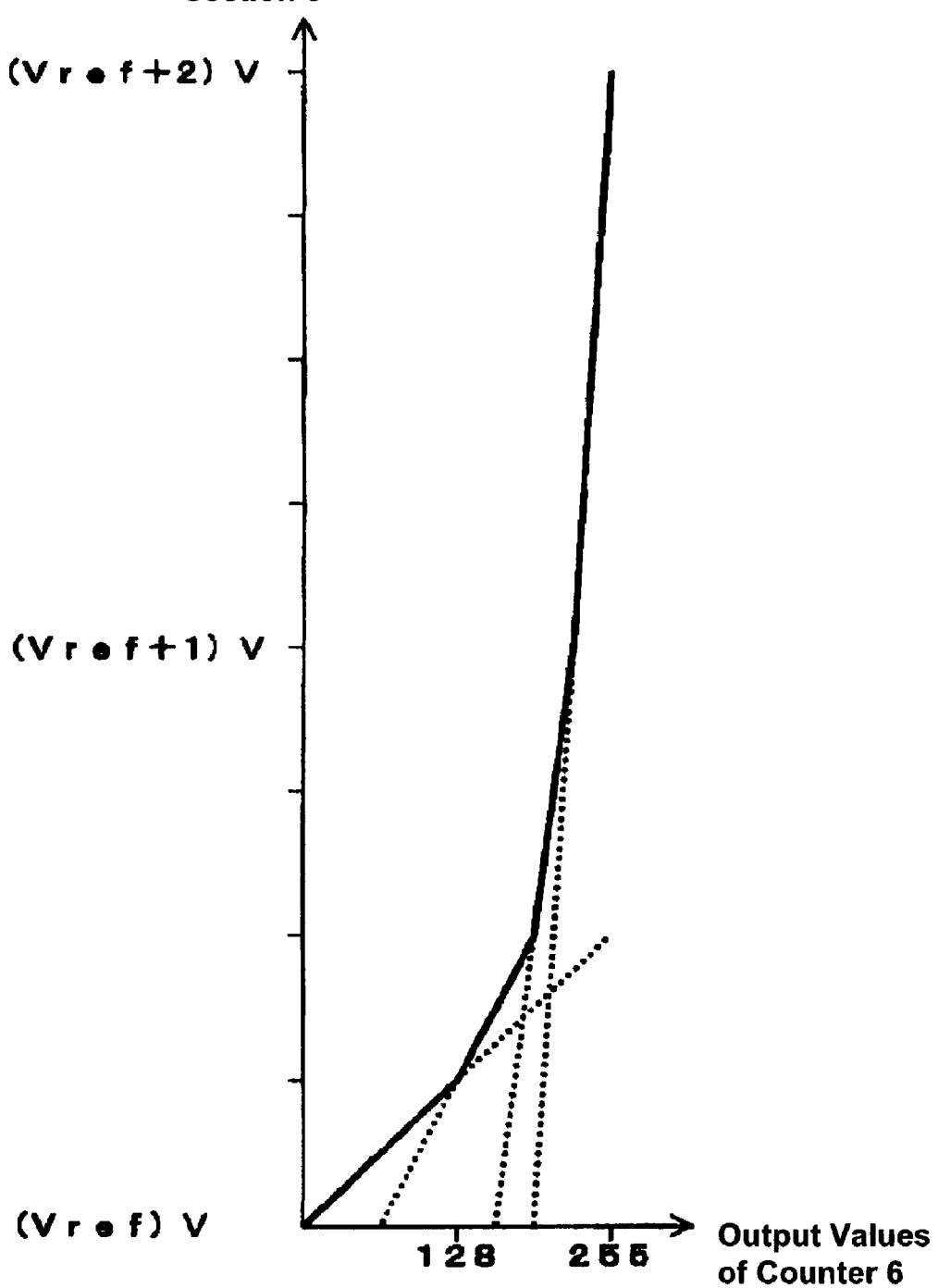
FIG. 5 shows a sweep signal output characteristic of a sweep signal generation section shown in FIG. 4.
Figure 6:
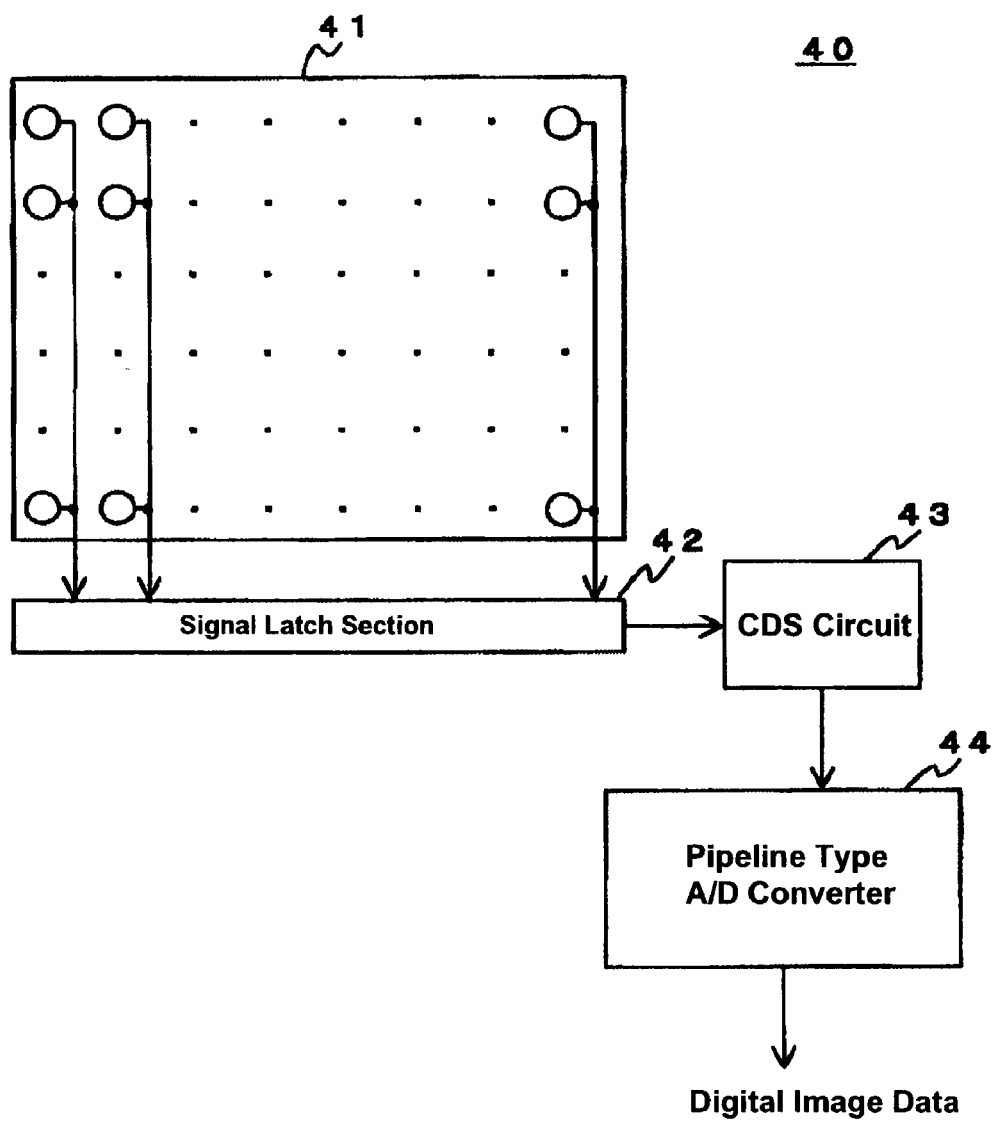
FIG. 6 shows an example of a conventional digital image photographing circuit.
Figure 7:
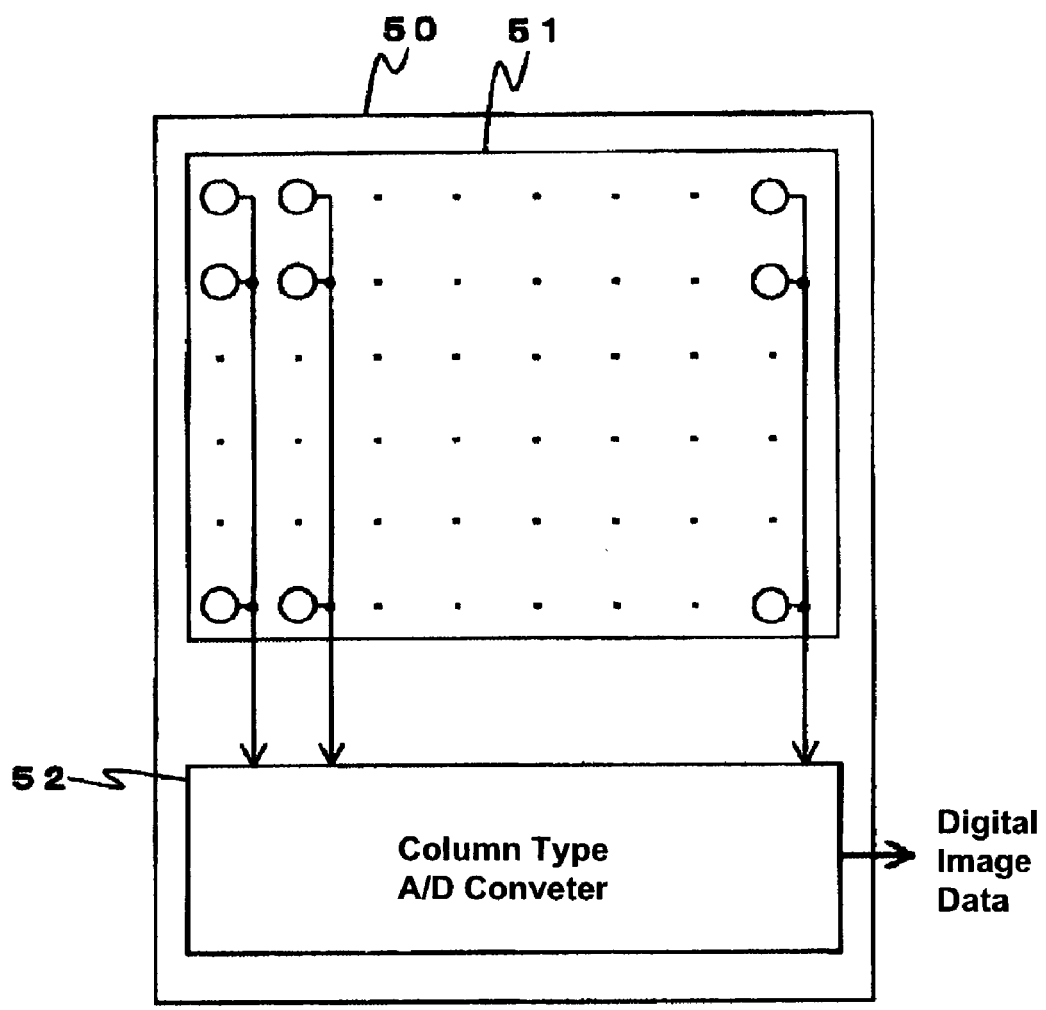
FIG. 7 shows an outline of a conventional semiconductor device.
Figure 8:
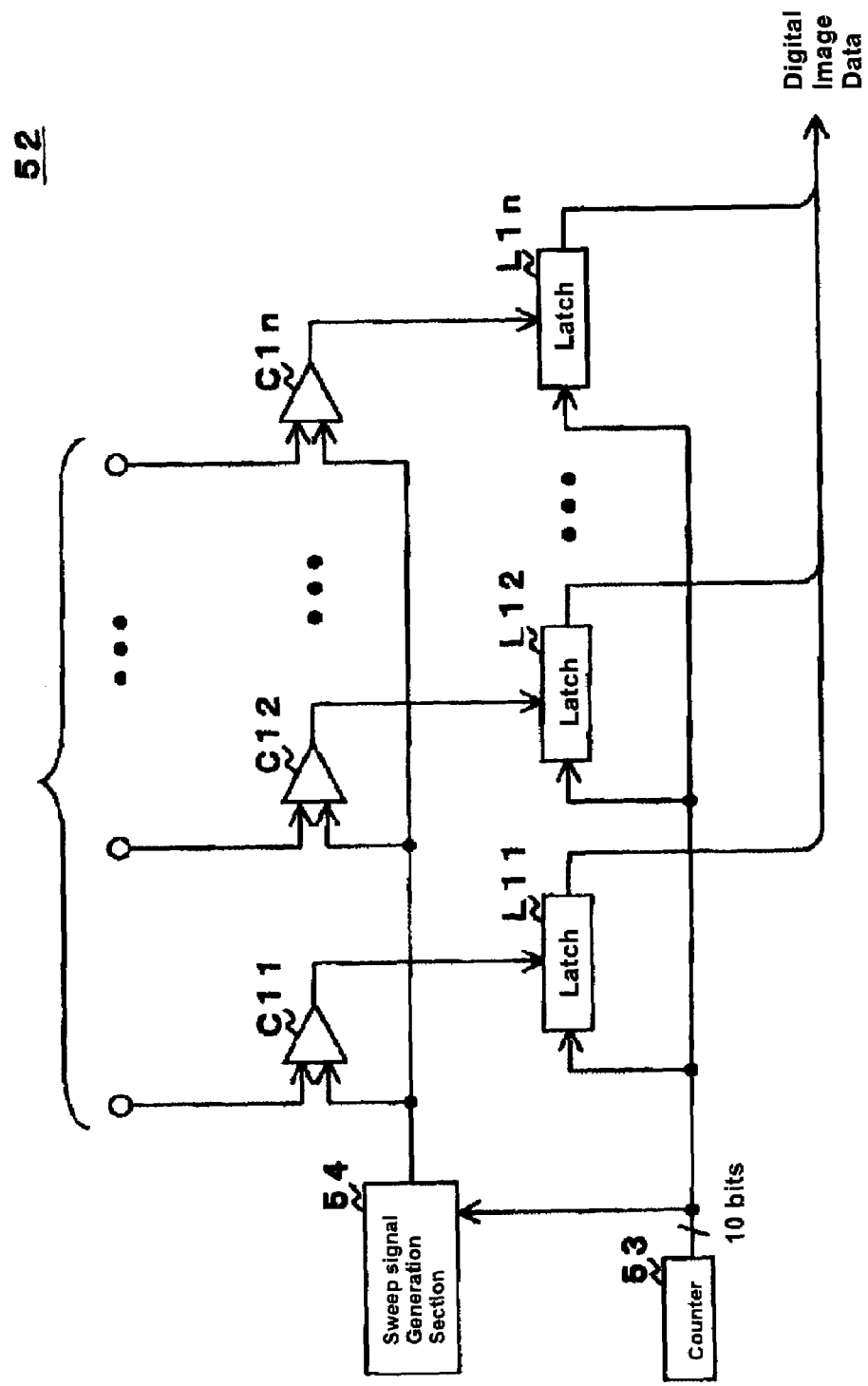
FIG. 8 shows an internal structure of a column type A/D converter shown in FIG. 7.
Figure 9:
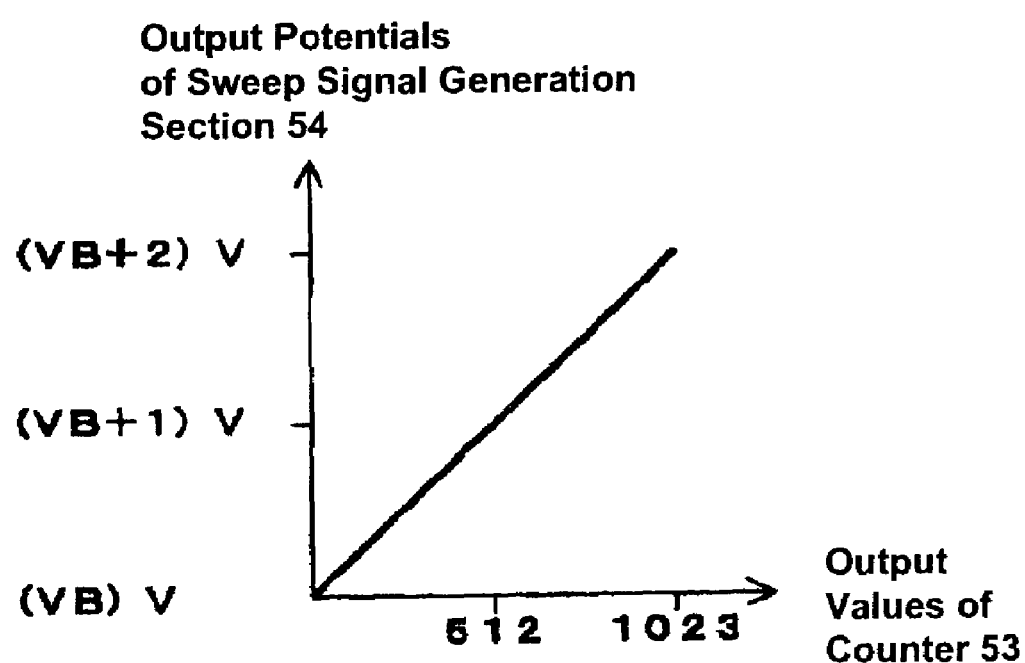
FIG. 9 shows a sweep signal output characteristic of a sweep signal generation section shown in FIG. 8.

Also, in the present embodiment, the A/D conversion section 4 is equipped with the counter 6 and the sweep signal generation section 7. However, as shown in FIG. 4, it may be equipped with the counter 6 and a sweep signal generation section 8. FIG. 5 shows a sweep signal output characteristic of the sweep signal generation section 8. In FIG. 5, integer values output from the counter 6 are indicated along a horizontal axis direction, and potentials of the sweep signal that is output from the sweep signal generation section 8 are indicated along a vertical axis direction.

As indicated in FIG. 5, when an integer value output from the counter 6 is x, and $0 \leq x \leq 127$, the sweep signal generation section 8 calculates y by the formula (1)

Further, using y, it outputs a potential calculated by $$(\text{Output potential}) \times \textit{Vref} + 2 \times y/1024 \tag{5}$$

Also, when $128 \leq x \leq 191$, the sweep signal generation section 8 calculates y by $$y = 2x - 128 \tag{6}$$

And using y, it outputs a potential calculated by the formula (5).

Further, when $192 \leq x \leq 223$, the sweep signal generation section 8 calculates y by $$y = 8x - 1280 \tag{7}$$

And using y, it outputs a potential calculated by the formula (5).

Further, when $224 \leq x \leq 255$, the sweep signal generation section 8 calculates y by $$y = 16x - 3072 \tag{8}$$

And using y, it outputs a potential calculated by the formula (5).

In this manner, by implementing the counter 6 and the sweep signal generation section 8, digital image data, which would otherwise have a 10-bit width by nature, can have an 8-bit width. In general, a RAM is structured to handle data in byte, with one byte composed of 8 bits. Therefore, by compressing digital image data to 8 bits, the design of peripheral circuits becomes easier, and the cost of the entire system can be reduced.

Moreover, since digital image data, which would otherwise have a 10-bit width by nature, can be formed into digital image data having an 8-bit width, the memory capacity for recording digital image data that is output from the semiconductor device 1 of the present embodiment can be substantially reduced. It goes without saying that an image processing engine performs the processing while correcting the digital image data to linear digital image data according to the A/D conversion described above.

Also, by further advancing what has been described above, the polygonal line graph can be more finely formed than that shown in FIG. 5 to create a curve that more rapidly rises, as the brightness becomes stronger. As a result, digital image data, which would otherwise have a 12-bit width by nature, can be formed into digital image data having an 8-bit width. In this case also, the image processing engine side can perform image processing with 12-bit accuracy by performing the processing while inversely converting the digital image data to linear digital image data according to such a polygonal line graph.

As described above, with the semiconductor device in accordance with the present invention, an area sensor and an A/D converter can be formed on the same semiconductor chip, the power consumption can be reduced, analog image signals can be converted into digital image data with a simple circuit, noise sources can be reduced, the cost can be reduced, and the bit width of digital image data can be compressed while achieving a high dynamic range.

The entire disclosure of Japanese Patent Application No. 2001-274843 filed Sep. 11, 2001 is incorporated by reference.

What is claimed is:

1. A semiconductor device that photographs images and outputs digital image data, the semiconductor device comprising:
    an area sensor including a plurality of image sensors, each of which outputs an analog image signal corresponding to an amount of received light; and
    an A/D conversion section that includes:
        a first circuit that outputs a numerical value ranging from an initial value to a final value,
        a second circuit that outputs a signal having a potential which rises in a polygonal line, the potential rising according to a first linear rise as the numerical value changes from the initial value toward a first intermediate value, according to a second linear rise as the numerical value changes from the first intermediate value to a second intermediate value, and according to a third linear rise as the numerical value changes from the second intermediate value to the final value, the third linear rise being greater than the second linear rise, and the second linear rise being greater than the first linear rise,
        a third circuit that compares the analog image signal and the signal output from the second circuit and outputs a comparative signal, and
        a fourth circuit that outputs the numerical value as digital image data according to the comparative signal.

2. A semiconductor device according to claim 1, wherein the A/D conversion section outputs digital image data having a narrower bit width than a bit width of digital image data provided by linearly A/D converting an analog image signal output from the image sensor.

3. A semiconductor device according to claim 1, wherein the A/D conversion section outputs digital image data having an 8-bit width.

4. A semiconductor device according to claim 1, wherein the image sensors are CMOS sensors.

5. A semiconductor device according to claim 1, wherein the image sensors are disposed in matrix.

6. A semiconductor device comprising:
    an area sensor including a plurality of image sensors disposed in a matrix, each of the plurality of image sensors being adapted to output an analog image signal corresponding to an amount of received light;
    a first signal latch section communicating with the plurality of image sensors, the first signal latch section being adapted to latch and output each analog image signal output from the area sensor;
    an A/D conversion section communicating with the signal latch section, the A/D conversion section being adapted to convert analog image signals output from the first signal latch section to digital image data, the A/D conversion section including:
        a first circuit that outputs a numerical value ranging from an initial value to a final value,
        a second circuit that outputs a signal having a potential which rises in a polygonal line, the potential rising according to a first linear rise as the numerical value changes from the initial value toward a first intermediate value, according to a second linear rise as the numerical value changes from the first intermediate value to a second intermediate value, and according to a third linear rise as the numerical value changes from the second intermediate value to the final value, the third linear rise being greater than the second linear rise, and the second linear rise being greater than the first linear rise,
        a third circuit that compares the analog image signal and the signal output from the second circuit and outputs a comparative signal, and
        a fourth circuit that outputs the numerical value as digital image data according to the comparative signal; and
    a second signal latch section communicating with the A/D conversion section, the second signal latch section being adapted to latch and output the digital image data output from the A/D conversion section.

7. A semiconductor device comprising:
    an area sensor including a plurality of image sensors that output analog image signals corresponding to an amount of received light;
    an A/D conversion section that includes:
        a signal latch section that latches the analog image signals;
        a counter that successively increments and outputs integer values;
        a sweep signal generation section that outputs sweep signals having potentials which rise in a polygonal line with respect to the integer values;

comparators that compare the analog image signals and the sweep signals and output high level signals when the sweep signals are greater than the analog image signals; and latches that latch and output integer values when signals output from the comparators become a high level; and a signal latch section that latches digital image data output from the A/D conversion section and outputs the same.

8. A method of photographing images and outputting digital data with a semiconductor device comprising:

receiving light with an area sensor including a plurality of image sensors;

outputting an analog signal corresponding to an amount of received light from each of said plurality of image sensors;

outputting a numerical value ranging from an initial value to a final value from a first circuit of an A/D conversion section;

outputting a signal from a second circuit of the A/D conversion section, the signal having a potential which rises in a polygonal line, the potential rising according to a first linear rise as the numerical value changes from the initial value toward the a first intermediate value, according to a second linear rise as the numerical value changes from the first intermediate value to a second intermediate value, and according to a third linear rise as the numerical value chances from the second intermediate value to the final value, the third linear rise being greater than the second linear rise, and the second linear rise being greater than the first linear rise;

comparing the analog image signal and the signal output from the second circuit and outputting a comparative signal from a third circuit of the A/D conversion section; and outputting the numerical value as digital image data according to the comparative signal from a fourth circuit of the A/D conversion section.

9. A method of photographing images and outputting digital data with a semiconductor device comprising:

outputting analog image signals corresponding to an amount of light received by a plurality of image sensors of an area sensor latching the analog image signals in a signal latch section;

successively incrementing and outputting integer values in a counter of an A/D conversion section;

outputting sweep signals having potentials which rise in a polygonal line with respect to the integer values from a sweep signal generation section of the A/D conversion section;

comparing the analog image signals and the sweep signals, and outputting high level signals when the sweep signals are greater than the analog image signals with comparators of the A/D conversion section; and latching and outputting integer values when signals output from the comparators become a high level in latches of the A/D conversion section; and latching digital image data output from the A/D conversion section and outputting the same from a signal latch section.

* * * * *

UNITED STATES PATENT AND TRADEMARK OFFICE
CERTIFICATE OF CORRECTION

| | | |
|---|---|---|
| PATENT NO. | : 7,123,302 B2 | Page 1 of 1 |
| APPLICATION NO. | : 10/241807 | |
| DATED | : October 17, 2006 | |
| INVENTOR(S) | : Ryuichi Shiohara | |

It is certified that error appears in the above-identified patent and that said Letters Patent is hereby corrected as shown below:

Col. 1, line 11: "quipped" should be -- equipped --.

Col. 1, line 57: Insert -- However, the pipeline type A/D converter has certain drawbacks such as large circuit scale and large power consumption because it performs the A/D conversion at high speeds. --

Col. 3, line 33: "reduce" should be -- reduced --.

Col. 4, line 31: "(VB) V" should be -- (Vb) V --.

Col. 4, line 31: "(VT) V" should be -- (Vt) V --.

Col. 4, line 33: "(VB) V" should be -- (Vb) V --.

Col. 4, line 33: "(VT) V" should be -- (Vt) V --.

Col. 4, line 42: "(VB) V" should be -- (Vb) V --.

Col. 4, line 43: "(VB+2) V" should be -- (Vb+2) V --.

Col. 9, line 24: delete "the".

Col. 9, line 28: "chances" should be -- changes --.

Signed and Sealed this

Third Day of April, 2007

JON W. DUDAS
*Director of the United States Patent and Trademark Office*